(12) United States Patent
Kanatsu

(10) Patent No.: US 11,927,933 B2
(45) Date of Patent: Mar. 12, 2024

(54) PROGRAM COMPARISON APPARATUS, PROGRAM COMPARISON METHOD, AND COMPUTER READABLE MEDIUM

(71) Applicant: Mitsubishi Electric Corporation, Tokyo (JP)

(72) Inventor: Yohei Kanatsu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 633 days.

(21) Appl. No.: 17/270,048

(22) PCT Filed: Oct. 18, 2018

(86) PCT No.: PCT/JP2018/038843
§ 371 (c)(1),
(2) Date: Feb. 22, 2021

(87) PCT Pub. No.: WO2020/079806
PCT Pub. Date: Apr. 23, 2020

(65) Prior Publication Data
US 2021/0325841 A1  Oct. 21, 2021

(51) Int. Cl.
*G05B 19/05* (2006.01)
*G05B 19/04* (2006.01)
*G06F 8/34* (2018.01)

(52) U.S. Cl.
CPC ......... *G05B 19/056* (2013.01); *G05B 19/041* (2013.01); *G05B 19/054* (2013.01);
(Continued)

(58) Field of Classification Search
CPC .. G05B 19/056; G05B 19/054; G05B 19/041; G05B 2219/3049; G05B 2219/13107; G05B 2219/3082; G05B 2219/3098
See application file for complete search history.

(56) References Cited

U.S. PATENT DOCUMENTS

| 7,143,366 B1 * | 11/2006 | McKelvey | G06F 8/71 715/965 |
| 2018/0260213 A1 * | 9/2018 | Yamaguchi | G06F 8/36 |

FOREIGN PATENT DOCUMENTS

| JP | 8-115110 A | 5/1996 |
| JP | 9-230915 A | 9/1997 |

(Continued)

OTHER PUBLICATIONS

International Search Report and Written Opinion dated Jan. 8, 2019, received for PCT Application PCT/JP2018/038843, Filed on Oct. 18, 2018, 6 pages including English Translation.

(Continued)

*Primary Examiner* — Anil K Bhargava
(74) *Attorney, Agent, or Firm* — XSENSUS LLP

(57) ABSTRACT

A program comparison apparatus includes: a set alignment unit that divides a comparison source-program which is a first FBD program into sets of program components connected to one another, and rearranges the sets in a line along a Y-axis direction which is a vertical direction in ascending order of execution, and also divides a comparison edited-program which is a second FBD program into sets of program components connected to one another, and rearranges the sets in a line along the Y-axis direction in ascending order of execution; a difference detection unit that detects a difference in the sets between the comparison source-program and the comparison edited-program rearranged as difference information; and a difference display control unit that causes the sets of the comparison source-program and the comparison edited-program that are rearranged to be displayed within a screen of a display device.

13 Claims, 11 Drawing Sheets

(52) U.S. Cl.
CPC ...... *G06F 8/34* (2013.01); *G05B 2219/13049* (2013.01); *G05B 2219/13082* (2013.01); *G05B 2219/13098* (2013.01); *G05B 2219/13107* (2013.01)

(56) References Cited

FOREIGN PATENT DOCUMENTS

| | | |
|---|---|---|
| JP | 2008-3725 A | 1/2008 |
| JP | 4556807 B2 | 10/2010 |
| JP | 2013-109713 A | 6/2013 |
| JP | 2015-146117 A | 8/2015 |

OTHER PUBLICATIONS

Notice of Reasons for Refusal dated May 14, 2019, received for JP Application 2019-516263, 5 pages including English Translation.
Decision to Grant dated Aug. 6, 2019, received for JP Application 2019-516263, 5 pages including English Translation.
Chinese Office Action dated Jan. 14, 2022, in corresponding Chinese Patent Application No. 201880098665.7, 14 pp.

\* cited by examiner

PROGRAM COMPARISON APPARATUS, PROGRAM COMPARISON METHOD, AND COMPUTER READABLE MEDIUM

CROSS-REFERENCE TO RELATED APPLICATION

The present application is based on PCT filing PCT/JP2018/038843, filed Oct. 18, 2018, the entire contents of which are incorporated herein by reference.

FIELD

The present invention relates to a program comparison apparatus, a program comparison method, and a program comparison program for comparing a program written in a function block diagram language.

BACKGROUND

In the field of factory automation (FA), the scale of systems has been increasing in recent years, and a sequence program used by a programmable logic controller (PLC) has been growing in scale and complexity so that quality assurance of the sequence program has become important.

A sequence program is often created by duplicating and reusing an existing sequence program which has been successfully used, rather than creating a new sequence program. In the case where the sequence program is reused, the existing sequence program is subjected to addition of processing, deletion of unnecessary processing, or partial change in logic. It is desirable at that time to clarify the changes made in the sequence program in terms of quality assurance.

When the changes in a comparison edited-program being an edited program are to be clarified, a comparison source-program being the existing sequence program and the comparison edited-program are compared.

A programming apparatus described in Patent Literature 1 compares two programs converted into the function block diagram (FBD) language, which is a graphic language, and displays a mismatch on a display screen.

CITATION LIST

Patent Literature

Patent Literature 1: Japanese Patent Application Laid-open No. H09-230915

SUMMARY

Technical Problem

However, in the technique of Patent Literature 1 above, program components are displayed on the screen while being arranged in a horizontal direction of the screen, that is, in an X-axis direction, so that when a program created long in the horizontal direction is subjected to comparison, fewer parts of the program can be displayed on one screen. Thus, when a user compares two programs, he needs to scroll the screen horizontally many times, which causes a problem in that it takes time and effort to refer to a comparison result.

The present invention has been made in view of the above, and an object of the present invention is to provide a program comparison apparatus that enables easy reference to a comparison result of a program written in a function block diagram language.

Solution to Problem

In order to solve the above problem and achieve the object, a program comparison apparatus according to an aspect of the present invention includes a set alignment unit that divides a first program which is a first function block diagram program into sets of program components connected to one another in the first program, and rearranges the sets of the first program in a line along a Y-axis direction which is a vertical direction in ascending order of execution, and also divides a second program which is a second function block diagram program into sets of program components connected to one another in the second program, and rearranges the sets of the second program in a line along the Y-axis direction in ascending order of execution. The program comparison apparatus of the present invention further includes a difference detection unit that detects a difference in the sets between the first program and the second program as difference information by comparing the sets of the first program rearranged and the sets of the second program rearranged. The program comparison apparatus of the present invention further includes a first display control unit that causes the sets of the first program and the sets of the second program that are rearranged, to be displayed within a screen of a display device that displays the first program and the second program, and causes the first program and the second program to be displayed side by side such that each of the sets of the first program and each of the sets of the second program corresponding to each other are displayed at the same level in the Y-axis direction, on the basis of the difference information.

Advantageous Effects of Invention

The program comparison apparatus according to the present invention has an effect of enabling easy reference to the comparison result of the program written in the function block diagram language.

DESCRIPTION OF EMBODIMENT

Hereinafter, a program comparison apparatus, a program comparison method, and a program comparison program according to an embodiment of the present invention will be described in detail with reference to the drawings. Note that the present invention is not limited to the embodiment.

Embodiment

Figure 1:
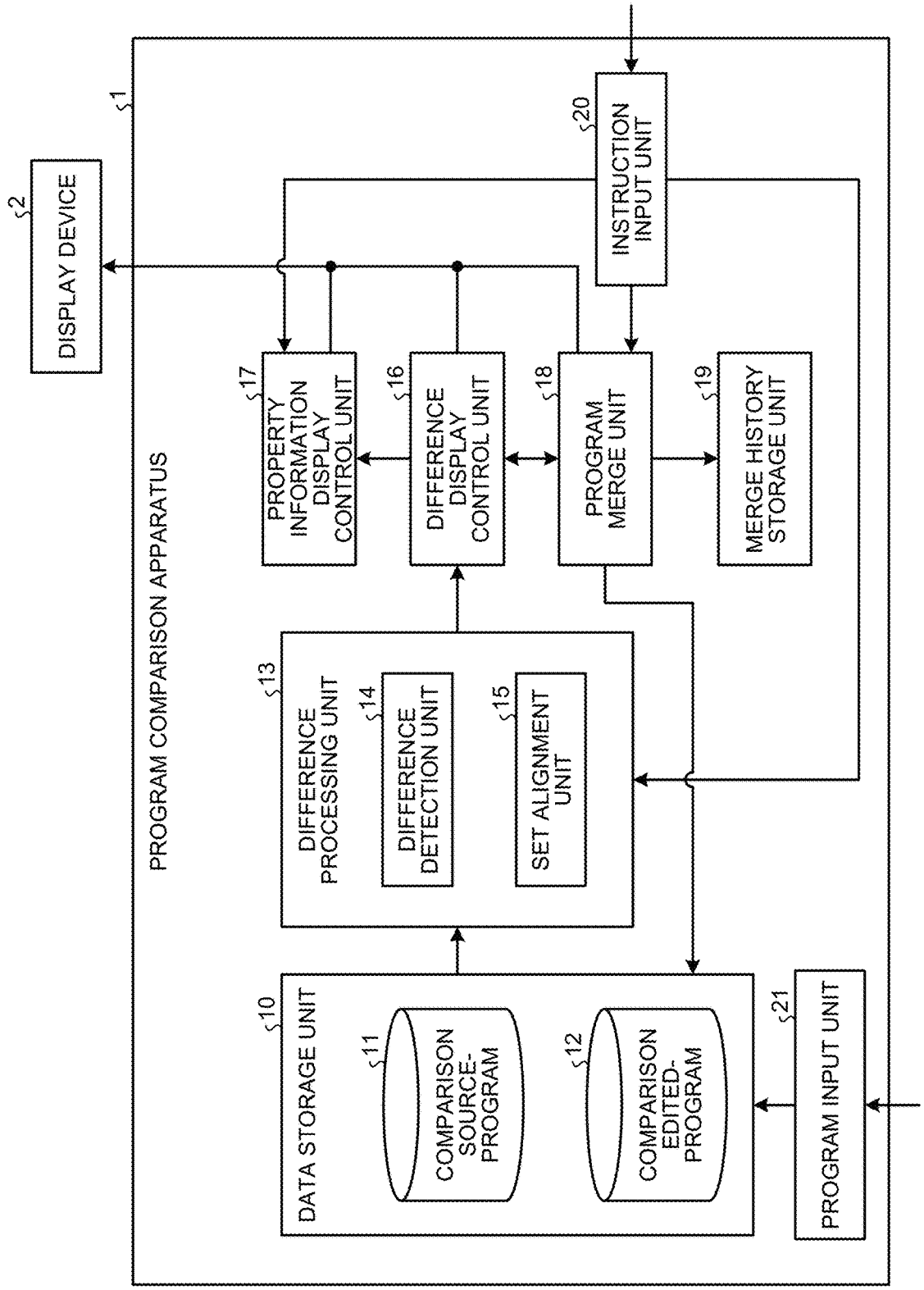
FIG. 1 is a diagram illustrating a configuration of a program comparison apparatus according to an embodiment.

FIG. 1 is a diagram illustrating a configuration of a program comparison apparatus according to an embodiment. A program comparison apparatus 1 is a computer that performs comparison for an FBD program written in an FBD language. The comparison performed in the present embodiment is processing of clarifying changes in the FBD program. When comparing two FBD programs against each other, the program comparison apparatus 1 compares FBD components of the FBD programs by arranging them in ascending order of execution along a vertical direction of a screen.

The program comparison apparatus 1 includes a data storage unit 10, a difference processing unit 13, a property information display control unit 17, a difference display control unit 16, a program merge unit 18, a merge history storage unit 19, an instruction input unit 20, and a program input unit 21. A display device 2 is connected to the difference display control unit 16, the property information display control unit 17, and the program merge unit 18. An example of the display device 2 is a liquid crystal monitor.

The instruction input unit 20 is connected to the difference processing unit 13, the property information display control unit 17, and the program merge unit 18. The program input unit 21 is connected to the data storage unit 10. The difference processing unit 13 is connected to the data storage unit 10 and the difference display control unit 16. The difference display control unit 16 is connected to the property information display control unit 17 and the program merge unit 18. The merge history storage unit 19 is connected to the program merge unit 18.

The data storage unit 10 is a memory or the like that stores data such as the FBD programs. The data storage unit 10 stores a comparison source-program 11 as a first program, and a comparison edited-program 12 as a second program. The comparison source-program 11 is an existing FBD program which has been successfully used. The comparison edited-program 12 is an FBD program obtained by duplicating and editing the comparison source-program 11. When the FBD program is edited, an FBD component is added, deleted, or changed. The addition, deletion, or change of the FBD component results in a difference between the comparison source-program 11 and the comparison edited-program 12. Note that the first program may include a program other than the comparison source-program 11, and the second program may include a program other than the comparison edited-program 12.

The program input unit 21 inputs, to the data storage unit 10, the comparison source-program 11 and the comparison edited-program 12 sent from an external device such as a program creating device that creates programs.

A sequence program used in a control device such as a PLC is written in a text language or graphic language as a programming language. Of the graphic languages, the FBD language standardized by the International Electrotechnical Commission (IEC) describes a series of processings by connecting FBD components corresponding to the processings. The unit of the FBD component is a function or a function block. The FBD language is the programming language that can be written in free format, and the order of execution of FBD components is determined by the positions of coordinates in which the FBD components are described.

Figure 2:
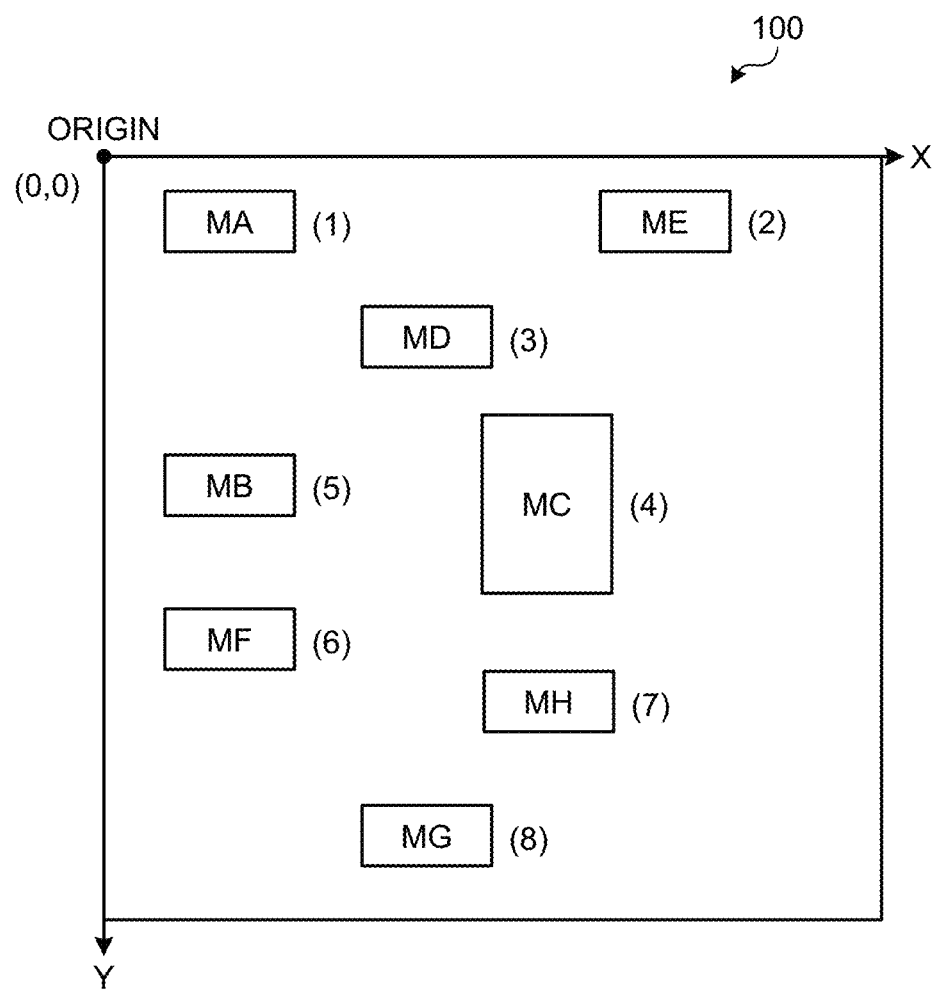
FIG. 2 is a diagram for explaining a procedure of execution of an FBD program that is subjected to comparison by the program comparison apparatus according to the embodiment.

Here, a procedure of execution of the FBD program will be described. FIG. 2 is a diagram for explaining the procedure of execution of the FBD program that is subjected to comparison by the program comparison apparatus according to the embodiment. An FBD program 100 includes a plurality of FBD components. FIG. 2 illustrates the FBD components as "MA", "MB", "MC", "MD", "ME", "MF", "MG", and "MH".

The FBD program 100 sets an upper left part of a two-dimensional coordinate system as an origin (0, 0), and the FBD components are executed in order from top to bottom in a Y-axis direction (vertical direction) and from left to right in an X-axis direction (horizontal direction). The Y-axis direction is given priority over the X-axis direction in terms of order.

In the case of the FBD program 100 illustrated in FIG. 2, the FBD components are executed in the following order of (1) to (8).

(1) "MA" FBD component
(2) "ME" FBD component
(3) "MD" FBD component
(4) "MC" FBD component
(5) "MB" FBD component
(6) "MF" FBD component
(7) "MH" FBD component
(8) "MG" FBD component Note that "MA" to "MG" may each be an FBD component group (or a set as described later) including a plurality of FBD components. In this case as well, the FBD component groups are executed in the same order as that described with reference to FIG. 2.

The instruction input unit 20 receives an instruction from a user of the program comparison apparatus 1 and inputs the received instruction to the difference processing unit 13, the property information display control unit 17, or the program merge unit 18. When the user of the program comparison apparatus 1 inputs, to the instruction input unit 20, an instruction to display a difference between the comparison source-program 11 and the comparison edited-program 12, the instruction input unit 20 sends this instruction to the difference processing unit 13.

When the user of the program comparison apparatus 1 inputs, to the instruction input unit 20, an instruction to display properties of the comparison source-program 11 and the comparison edited-program 12, the instruction input unit 20 sends this instruction to the property information display control unit 17. Alternatively, when the user of the program comparison apparatus 1 inputs, to the instruction input unit 20, an instruction to merge the comparison source-program 11 and the comparison edited-program 12, the instruction input unit 20 sends this instruction to the program merge unit 18.

The difference processing unit 13 includes a difference detection unit 14 and a set alignment unit 15. The set alignment unit 15 reads the comparison source-program 11 and the comparison edited-program 12 from the data storage unit 10.

The set alignment unit 15 divides the comparison source-program 11 into sets of FBD components which are connected to each other in the comparison source-program 11. In other words, for the FBD components in the comparison source-program 11, the set alignment unit 15 sets the FBD components connected to each other in one FBD component group. Similarly, the set alignment unit 15 divides FBD components arranged in the comparison edited-program 12 into units of the FBD components connected to each other. In the present embodiment, a group of the FBD components obtained by the division by the set alignment unit 15 is called a set. That is, a set is a group of the FBD components connected to each other. The set alignment unit 15 thus divides each of the comparison source-program 11 and the comparison edited-program 12 into sets.

The set alignment unit 15 rearranges the sets in the comparison source-program 11 in a line along the vertical direction (Y-axis direction) according to the order of execution of the sets in the comparison source-program 11. The set alignment unit 15 also rearranges the sets in the comparison edited-program 12 in a line along the vertical direction according to the order of execution of the sets in the comparison edited-program 12. The set alignment unit 15 arranges the sets so that a set to be executed earlier than the other set is placed on the upper side. The set alignment unit 15 sends an alignment result indicating a result of rearranging the sets to the difference detection unit 14. The alignment result sent from the set alignment unit 15 to the difference detection unit 14 includes a position (coordinates within a screen) of each set in the comparison source-program 11 and a position (coordinates within the screen) of each set in the comparison edited-program 12.

The difference detection unit 14 detects a difference between the comparison source-program 11 and the comparison edited-program 12 on the basis of the comparison source-program 11 and the comparison edited-program 12 in each of which the sets have been rearranged by the set alignment unit 15. That is, the difference detection unit 14 detects a difference between the comparison source-program 11 and the comparison edited-program 12 on the basis of the arrangement of the sets rearranged by the set alignment unit 15. The difference detection unit 14 determines whether or not there is a difference between the comparison source-program 11 and the comparison edited-program 12 on a set-by-set basis, and extracts a set having a difference. The difference between the comparison source-program 11 and the comparison edited-program 12 corresponds to addition of a set, deletion of a set, or change of a set.

The difference processing unit 13 extracts, for example, a set that is present in one of the comparison source-program 11 and the comparison edited-program 12 but absent in the other. Also, when some sets are arranged at different positions for the comparison source-program 11 and the comparison edited-program 12, that is, the order of processing of the sets is different, the difference processing unit 13 extracts the sets having the different positions.

Moreover, when the comparison edited-program 12 is created by editing a part of the FBD components within a set in the comparison source-program 11, the difference processing unit 13 extracts a difference in the FBD component generated by the editing. The difference in the FBD component includes a difference due to a change of the FBD component itself and a difference due to a change in property information of the FBD component. The difference detection unit 14 sends difference information, which is a result of detection of the difference, to the difference display control unit 16. The difference information is information indicating the difference between the comparison source-program 11 and the comparison edited-program 12, that is, difference parts. The difference information indicates the content of the difference in the set extracted by the difference detection unit 14, or the content of the difference in the FBD component extracted by the difference detection unit 14. The property information is information indicating properties of the FBD component.

Note that in the following description, the comparison source-program 11 and the comparison edited-program 12 are collectively referred to as a comparison target program in some cases. The comparison target program contains the property information of the FBD components.

The difference display control unit 16 that is a first display control unit, causes the display device 2 to display the comparison target program whose sets are rearranged by the set alignment unit 15, such that the difference information is displayed in a specific display mode. The difference display control unit 16 causes the display device 2 to display the comparison target program such that the set and the FBD component included in the difference information can be identified as being due to addition, deletion, or change on the basis of the difference information. For example, the difference display control unit 16 controls to highlight the comparison target program such that the set and the FBD component can be identified as being due to addition, deletion, or change by color-coding the set and the FBD component.

When having received an instruction to display the property information, the property information display control unit 17 that is a second display control unit, extracts the property information from the difference display control unit 16 and causes the display device 2 to display the property information. Specifically, the property information display control unit 17 reads the property information of the FBD component included in the set that is identified by a user, from the difference information of the difference display control unit 16. Because the difference information of the difference display control unit 16 also includes a property difference that is the difference in the property information. Accordingly, the property information display control unit 17 reads the difference in the property information, causes the display device 2 to display the difference in the property information, extracts the property information of the FBD component included in the comparison edited-program 12 from the comparison edited-program 12, and causes the display device 2 to display the property information. At this time, the property information display control unit 17 causes the display device 2 to display the property information of the FBD component included in the comparison source-program 11 and the property information of the FBD component included in the comparison edited-program 12, side by side on the screen of the display device 2. The property information display control unit 17 further causes the display device 2 to highlight the difference in the property information on the basis of the difference information.

When having received an instruction to merge the comparison target program, the program merge unit 18 executes merging of the comparison source-program 11 and the comparison edited-program 12. Specifically, the program merge unit 18 extracts a part obtained by editing the comparison source-program 11 from the comparison edited-program 12, and reflects the part in the comparison source-program 11. The program merge unit 18 merges sets each having a difference between the comparison source-program 11 and the comparison edited-program 12 on units of sets or collectively. The program merge unit 18 creates a merge history and stores it in the merge history storage unit 19. The merge history storage unit 19 is a memory or the like that stores the merge history.

Figure 3:
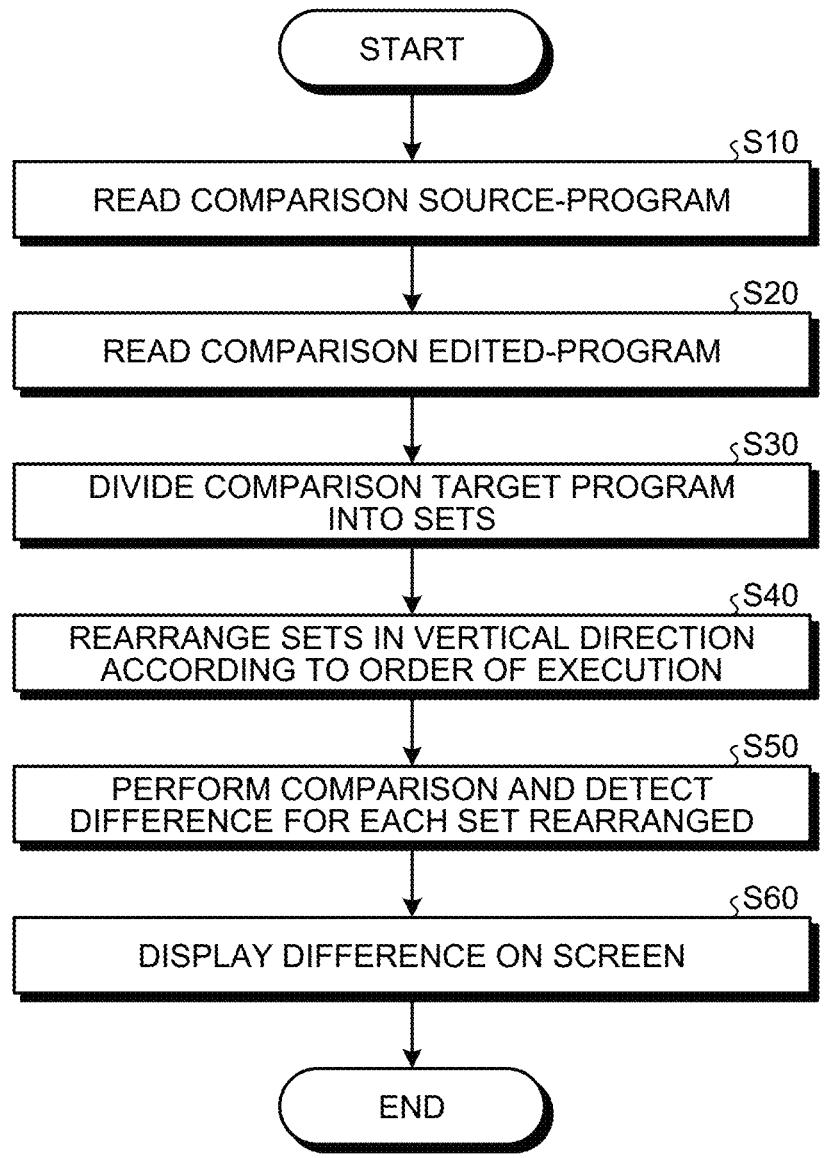
FIG. 3 is a flowchart illustrating a procedure of comparison processing executed by the program comparison apparatus according to the embodiment.

FIG. 3 is a flowchart illustrating a procedure of comparing processing executed by the program comparison apparatus according to the embodiment. When the instruction input unit 20 receives an instruction to display a difference between the comparison source-program 11 and the comparison edited-program 12, the instruction input unit 20 sends this instruction to the difference processing unit 13.

The set alignment unit 15 reads the comparison source-program 11 from the data storage unit 10 (step S10). The set alignment unit 15 also reads the comparison edited-program 12 from the data storage unit 10 (step S20). Note that the processing in either step S10 or step S20 may be executed prior to the other.

The set alignment unit 15 divides the comparison target program into units of sets (step S30). Specifically, the set alignment unit 15 divides the comparison source-program 11 into units of sets, and divides the comparison edited-program 12 into units of sets.

Note that the set alignment unit 15 may divide the comparison source-program 11 into units of sets before reading the comparison edited-program 12 from the data storage unit 10. Similarly, the set alignment unit 15 may divide the comparison edited-program 12 into units of sets before reading the comparison source-program 11 from the data storage unit 10.

The order of execution of the units of sets is similar to the order of execution of FBD components, and is determined depending on (X, Y) coordinates at an upper left part of each set. The set alignment unit 15 rearranges the sets in the vertical direction according to the order of execution (step S40). The set alignment unit 15 arranges the sets included in the comparison source-program 11 in a line along the vertical direction (Y-axis direction) in the order of execution, and arranges the sets included in the comparison edited-program 12 in a line along the vertical direction in the order of execution. At this time, the set alignment unit 15 adjusts the position of each set such that the set included in the comparison source-program 11 and the corresponding set included in the comparison edited-program 12 have the same Y coordinate, that is, are arranged at the same level, when the sets are identical to each other.

The difference detection unit 14 detects a difference between the comparison source-program 11 and the comparison edited-program 12 by comparing the comparison source-program 11 and the comparison edited-program 12 for each set rearranged (step S50). The difference detection unit 14 compares the sets having the same Y coordinate between the comparison source-program 11 and the comparison edited-program 12, and detects a difference between the sets. The difference detected by the difference detection unit 14 is change, deletion, or addition of a set. That is, the difference detection unit 14 detects which set in the comparison edited-program 12 has been changed, deleted, or added with respect to the comparison source-program 11.

The difference detection unit 14 sends the sets rearranged and difference information, to the difference display control unit 16. The difference display control unit 16 causes the display device 2 to display the comparison target program on the basis of the arrangement of the sets rearranged by the set alignment unit 15. That is, the difference display control unit 16 controls to display the comparison target program on a screen on the basis of the sets rearranged and the difference information. Specifically, the difference display control unit 16 controls to display the comparison source-program 11 whose sets have been rearranged and the comparison edited-program 12 whose sets have been rearranged, side by side on the left and right sides of the screen on the display device 2. At this time, the difference display control unit 16 causes the display device 2 to display the programs on the screen such that the difference between the set in the comparison source-program 11 and the set in the comparison edited-program 12 can be visually recognized by a user (step S60). The difference display control unit 16 controls to display the difference such that it can be visually recognized by a user by performing color-coding or the like on the sets having the difference.

Figure 4:
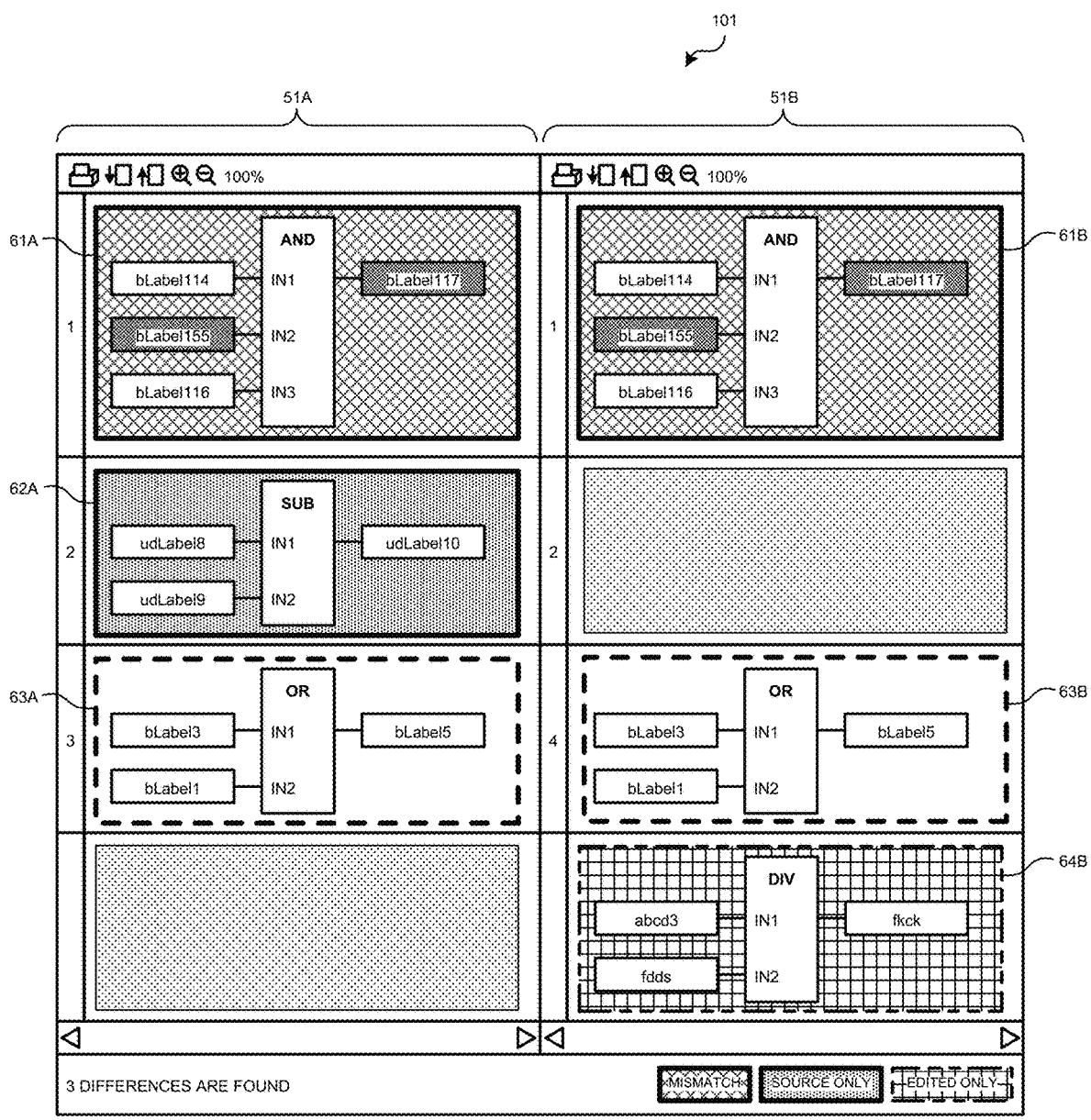
FIG. 4 is a diagram illustrating an example of a comparison target program displayed on a screen by the program comparison apparatus according to the embodiment.

FIG. 4 is a diagram illustrating an example of the comparison target program displayed on the screen by the program comparison apparatus according to the embodiment. The set alignment unit 15 rearranges the sets in the comparison source-program 11 according to the order of execution, aligns left ends of the sets rearranged, and arranges them at regular intervals in the vertical direction. Similarly, the set alignment unit 15 rearranges the sets in the comparison edited-program 12 according to the order of execution, aligns left ends of the sets rearranged, and arranges them at regular intervals in the vertical direction. The set alignment unit 15 arranges the comparison source-program 11 and the comparison edited-program 12 side by side such that the sets in the comparison source-program 11 and the corresponding sets in the comparison edited-program 12 are at the same level in the vertical direction.

The difference display control unit 16 arranges all the sets compared in the comparison target program on the left and right sides of a screen 101, in the order and position they have been rearranged. Here, a description will be given of a case where the difference display control unit 16 controls to display the comparison source-program 11 in a left area 51A being a left half of the screen 101, and display the comparison edited-program 12 in a right area 51B being a right half of the screen 101. Note that when the sets in the comparison target program are too many to be entirely displayed on the screen 101, the difference display control unit 16 may control to display a part of the sets in the comparison target program on the screen 101.

The comparison source-program 11 includes sets 61A, 62A, and 63A, and the comparison edited-program 12 includes sets 61B, 63B, and 64B. In this case, it is assumed that the processing is executed in the order of the set 61A, the set 62A, and the set 63A in the comparison source-program 11, and the processing is executed in the order of the set 61B, the set 63B, and the set 64B in the comparison edited-program 12.

Moreover, the set 61A corresponds to the set 61B, and the set 63A corresponds to the set 63B. That is, the set 61A and the set 61B have the same configuration but different property information, and the set 63A and the set 63B are the same. In other words, when the comparison edited-program 12 in the right area 51B is created by editing the comparison source-program 11 in the left area 51A, the configurations of the sets 61A and 63A are not edited. Meanwhile, when the comparison edited-program 12 in the right area 51B is created by editing the comparison source-program 11 in the left area 51A, the set 62A is deleted, and the set 64B is added after the set 63B.

The difference display control unit 16 controls to display the left area 51A and the right area 51B on the screen 101 that is the same screen. Specifically, the difference display control unit 16 controls to display the sets 61A, 62A, and 63A in the left area 51A of the screen 101 with the left ends of the sets 61A, 62A, and 63A aligned, and to display the sets 61B, 63B, and 64B in the right area 51B of the screen 101 with the left ends of the sets 61B, 63B, and 64B aligned. At this time, the left area 51A and the right area 51B are displayed such that the Y coordinate of the set 61A is identical to the Y coordinate of the set 61B and that the Y coordinate of the set 63A is identical to the Y coordinate of the set 63B. Moreover, an area corresponding to the set 64B in the left area 51A is blank, and an area corresponding to the set 62A in the right area 51B is blank.

The difference display control unit 16 controls to display each set by color-coding each set such that a changed set is colored red, a deleted set is colored blue, and an added set is colored green according to the difference information from the difference detection unit 14. That is, the difference display control unit 16 controls to highlight the set being the difference between the comparison source-program 11 and the comparison edited-program 12 by color-coding or the like on the basis of the difference information such that the set can be distinguished from the other sets. The highlighting in the present embodiment is to display in a different mode from the other sets.

Note that the difference display control unit 16 may color the area where a set has been deleted. The difference display control unit 16 controls to color the FBD component before and after the change in a different color from the others, such as yellow, for the sets before and after the change. Note that the method of display is not limited to these.

The program comparison apparatus 1 vertically arranges the sets 61A, 62A, and 63A in the comparison source-program 11 and the sets 61B, 63B, and 64B in the comparison edited-program 12 on the screen 101 as described above, thereby more sets can be displayed than when the sets are arranged in the horizontal direction for comparison. As a result, many comparison results can be displayed on one screen, whereby a user can refer to the comparison results easily and reduce the time for the comparing work. Moreover, the user can easily identify the difference because the difference being a mismatch between the comparison source-program 11 and the comparison edited-program 12 can be displayed in the graphic language itself, instead of the mnemonic expression.

A user may wish to compare a difference in the property information of an input terminal and an output terminal of the FBD components in a set. When receiving an instruction to display the property information from the user, the instruction input unit 20 sends this display instruction to the property information display control unit 17. The property information display control unit 17 reads, from the difference display control unit 16, the property information of the set indicated by the display instruction and causes the display device 2 to display the property information. The display instruction for the property information is input to the instruction input unit 20 when the user indicates the set on the screen 101 using a mouse or the like.

Figure 5:
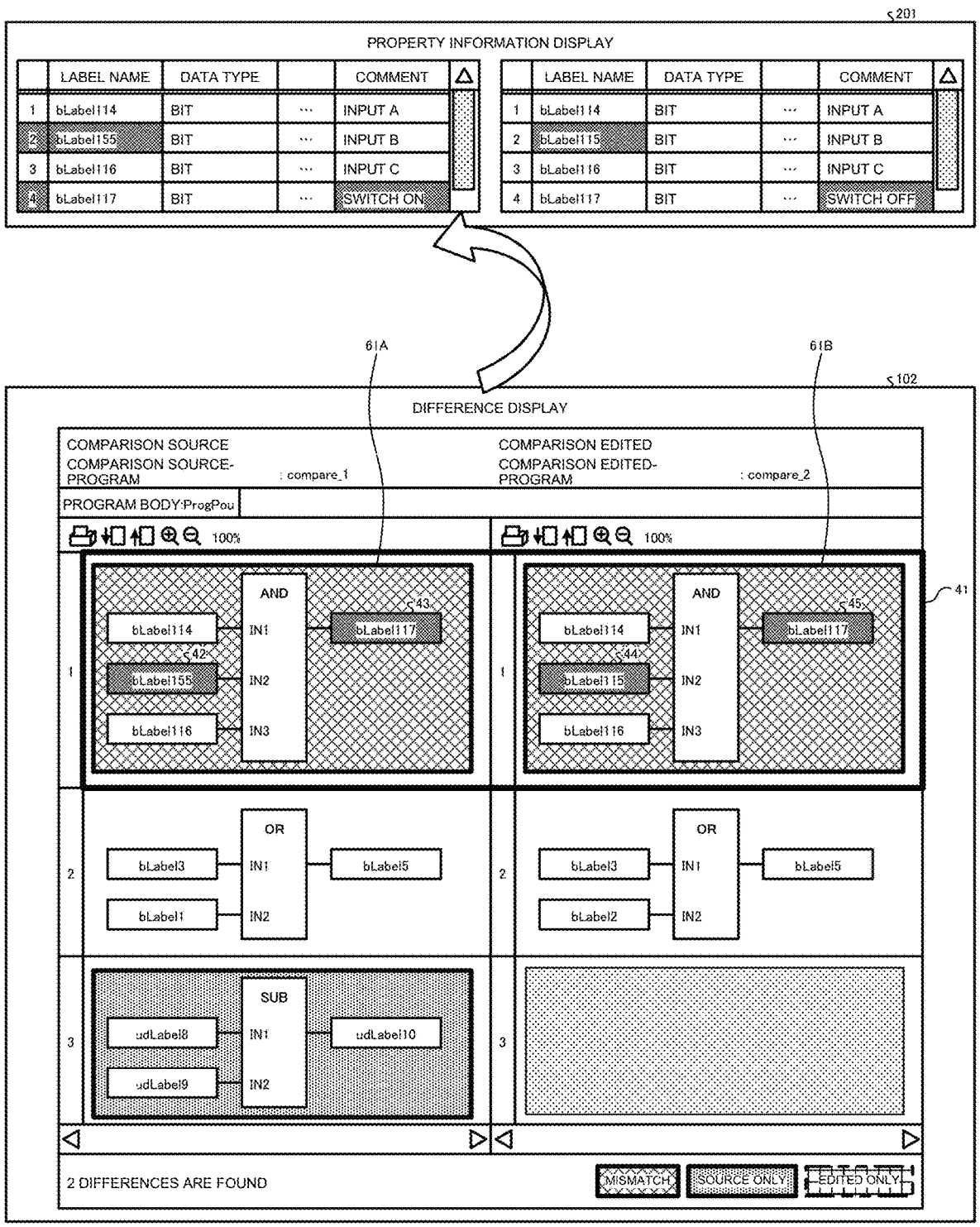
FIG. 5 is a diagram for explaining property information displayed on a screen by the program comparison apparatus according to the embodiment.

FIG. 5 is a diagram for explaining the property information displayed on a screen by the program comparison apparatus according to the embodiment. A screen 102 is a screen on which the comparison target program is displayed in the vertical direction as with the screen 101.

When any set on the screen 102 has been indicated by a user, the property information display control unit 17 controls to display a screen 201 for displaying the property information instead of the screen 102. That is, the property information display control unit 17 controls to switch the display by jumping from the difference display of the FBD programs to the difference display of the property information. Specifically, the property information display control unit 17 causes the screen 201 to display the property information of the FBD components included in the set indicated, and the property information of the FBD components included in the set having the same Y coordinate as the set indicated. For example, when the set 61A has been indicated, the property information display control unit 17 causes the screen 201 to display the property information of an area 41 including the set 61A and the set 61B that has the same Y coordinate as the set 61A.

Of the FBD components, ones corresponding to the input terminal or output terminal are subject to a change. Each of the sets 61A and 61B has three input terminals and one output terminal. FIG. 5 illustrates the input terminals in the set 61A by "bLabel114", "bLabel155", and "bLabel116", and illustrates the output terminal in the set 61A by "bLabel117". Also, FIG. 5 illustrates the input terminals in the set 61B by "bLabel114", "bLabel115", and "bLabel116", and illustrates the output terminal in the set 61B by "bLabel117". That is, "bLabel155" which is an FBD component 42 in the set 61A is edited to be "bLabel115" which is an FBD component 44 in the set 61B. Moreover, "bLabel117" which is an FBD component 43 in the set 61A is edited to be "bLabel117" which is an FBD component 45 in the set 61B. In this case, the property information display control unit 17 extracts the FBD components 42 to 45 subjected to editing on the basis of the difference information used by the difference display control unit 16, and controls to display the property information of the FBD components 42 to 45 in a different color from the property information of the other FBD components. That is, the property information display control unit 17 controls to display a part corresponding to the difference between the property information of the FBD components included in the set 61A and the property information of the FBD components included in the set 61B, on the screen 201 such that the part can be distinguished from the other parts.

As described above, in the present embodiment, the screen 102 is associated with the screen 201 by the difference information. Therefore, the difference display control unit 16 can control to display the difference between the comparison source-program 11 and the comparison edited-program 12 on the basis of the difference information, and the property information display control unit 17 can control to display the difference in the property information between the sets on the basis of the difference information.

When the set 61A being a first set, the set 61B being a second set, or the area 41 is indicated by a user, the property information display control unit 17 causes the screen 201 to display first property information which is the property information of the set 61A, and second property information being the property information of the set 61B. The area 41 is the area including the set 61A and the set 61B. Therefore, the case where the area 41 is indicated by the user, is the case where the set 61A and the set 61B are indicated.

The property information is information in which a "label name", a "data type", and a "comment" are associated with one another. The "label name" indicates the name of a label of the FBD component, the "data type" indicates the type of data of the FBD component, and the "comment" indicates a function of the FBD component.

In the example of FIG. 5, "bLabel155" in the set 61A is edited to be "bLabel115" in the set 61B; accordingly, "bLabel155" and "bLabel115" under the "label name" are displayed in a different color from the others under the "label name" on the screen 201.

Moreover, in the example of FIG. 5, the "comment" for "bLabel117" is edited from "switch on" to "switch off"; accordingly, "switch on" and "switch off" under the "comment" are displayed in a different color from the others under the "comment" on the screen 201.

As described above, the program comparison apparatus 1 detects the difference information including the difference in the property information using the difference processing unit 13, and thus can easily display the difference in the comparison target program and the difference in the property information between the sets. Moreover, the program comparison apparatus 1 switches screens from the screen 102 that displays the difference in the comparison target program to the screen 201 that displays the difference in the property information between the sets on the basis of the difference information, thereby easily switching the screens. This makes it easy to display the differences in the property information, and thus facilitates detailed reference to the comparison result and can reduce the time for the comparing work.

When a click operation is performed on any of the input/output terminals highlighted in the area 41 changed, the property information display control unit 17 controls to change the screen 102 to the screen 201 and may further move a cursor to a row in the screen 201 displaying the property information of the input/output terminal that has been clicked. That is, when a click operation indicates any of the FBD components 42 and 44 highlighted and indicating the input terminals and the FBD components 43 and 45 highlighted and indicating the output terminals, the property information display control unit 17 may control to move the cursor to a row in the screen 201 displaying the property information of the terminal indicated. Note that means for switching the screen 102 and the method of displaying the difference are not limited to this. The program comparison apparatus 1 may also cause the screen 102 and the screen 201 to be displayed at the same time.

Figure 6:
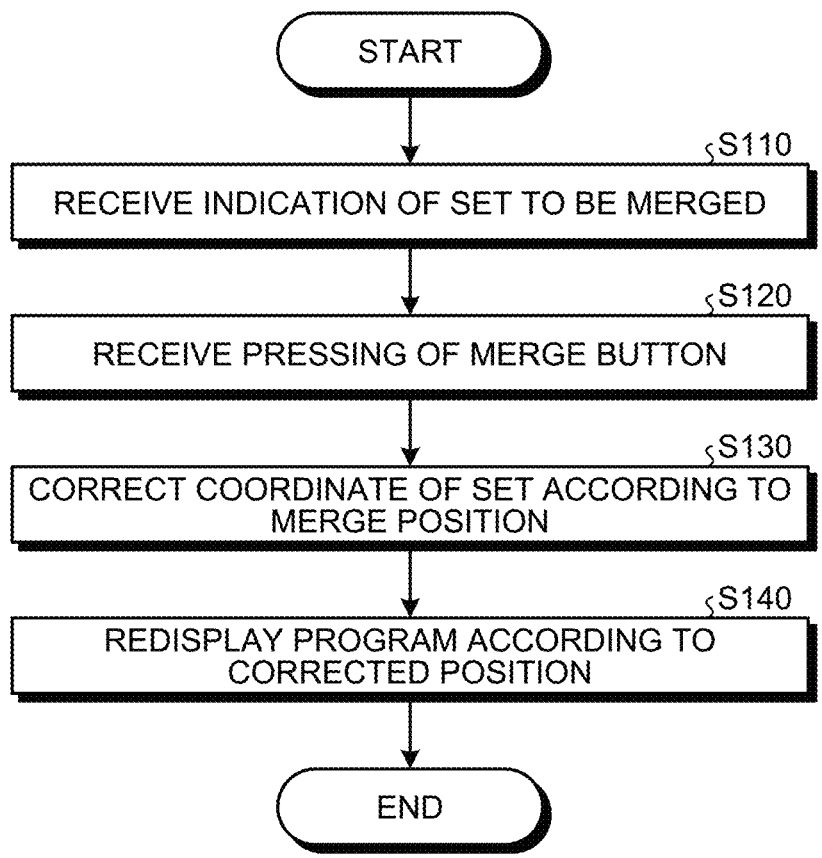
FIG. 6 is a flowchart illustrating a procedure of merge processing executed by the program comparison apparatus according to the embodiment.

Next, merge processing of the comparison target program will be described. FIG. 6 is a flowchart illustrating a procedure of the merge processing executed by the program comparison apparatus according to the embodiment. A user indicates a set to be merged on the screen 102, and presses a merge button displayed on the screen 102. The merge button is a button for instructing the execution of the merge. A merge instruction for the comparison target program is made by indicating the set and pressing the merge button by the user.

Upon receiving the merge instruction for the comparison target program, the instruction input unit 20 sends this instruction to the program merge unit 18. The program merge unit 18 receives information indicating the set to be merged (step S110), and receives pressing of the merge button (step S120).

The program merge unit 18 corrects the coordinates of the comparison source-program 11 according to a merge position indicated by the user (step S130). At this time, the program merge unit 18 corrects the X coordinate and the Y coordinate of the set in the comparison source-program 11 according to the editing content of the set. The program merge unit 18 further reflects the content of the set in the comparison edited-program 12 indicated by the user in the comparison source-program 11. The correction of the X and Y coordinates of the set in the comparison source-program 11 will be described later.

The program merge unit 18 redisplays the comparison target program according to the corrected positions of the coordinates (step S140). That is, the program merge unit 18 causes the screen 102 to display the comparison target program such that the set in the comparison source-program 11 which has been changed to the set in the comparison edited-program 12, becomes the content after the change. The program merge unit 18 also creates a merge history and causes the merge history storage unit 19 to store the merge history.

Figure 7:
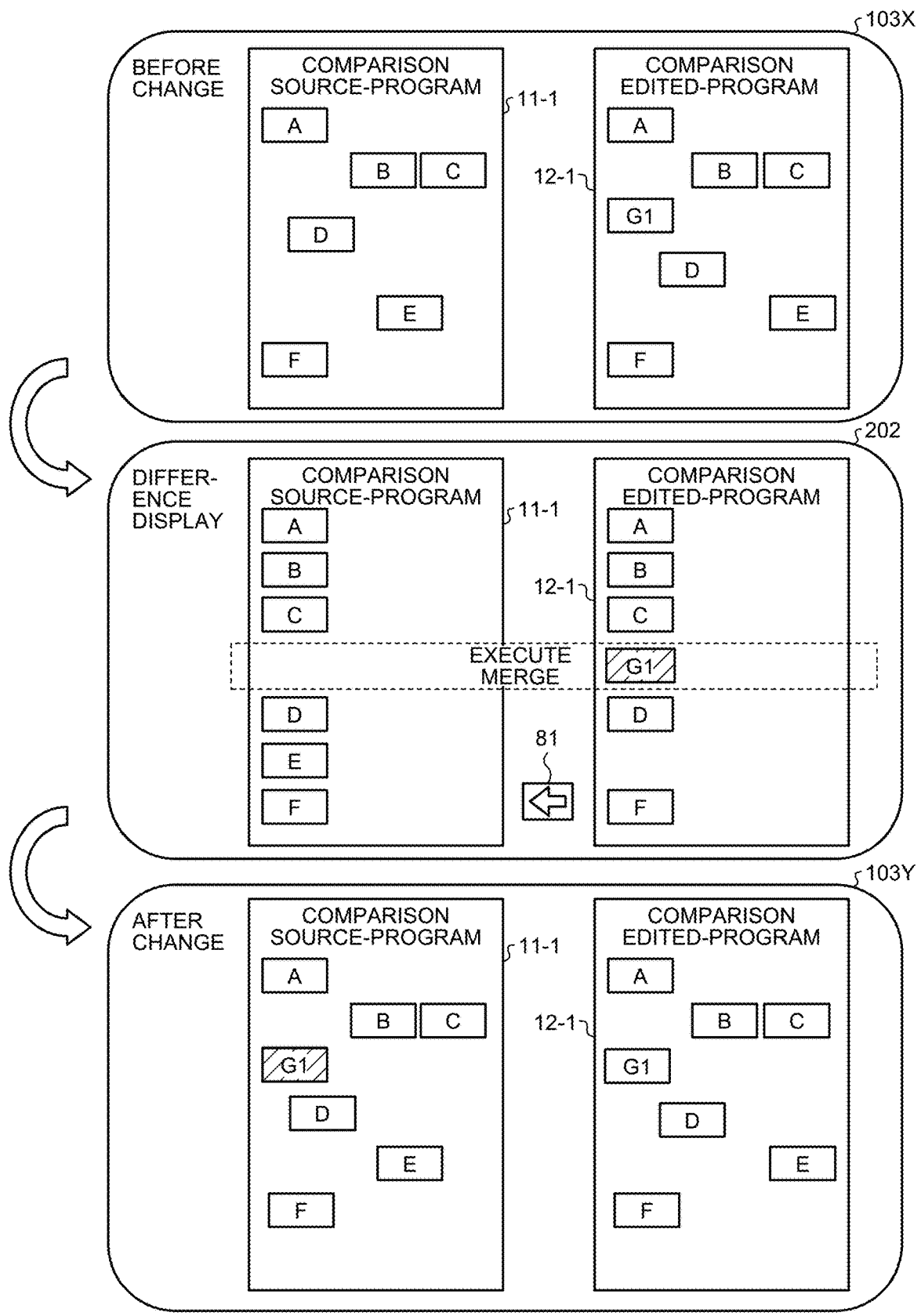
FIG. 7 is a diagram illustrating a first display example of a comparison target program that is merged by the program comparison apparatus according to the embodiment.

FIG. 7 is a diagram illustrating a first display example of the comparison target program that is merged by the program comparison apparatus according to the embodiment. In the first display example, when the program comparison apparatus 1 merges and displays the comparison target program, the Y coordinate of a set in a comparison source-program 11-1 is corrected for display. FIGS. 7 to 10 denote sets of FBD components by "A", "B", "C", "D", "E", "F", "G1", "G2", and "G3".

It is assumed that the comparison target program before the change (before the merge) is a comparison target program 103X illustrated in FIG. 7. The comparison target program 103X includes the comparison source-program 11-1 and a comparison edited-program 12-1. Here, the comparison edited-program 12-1 is obtained by adding the set "G1" to the comparison source-program 11-1. Note that the program comparison apparatus 1 may or need not display the comparison target program 103X on the display device 2.

The difference processing unit 13 rearranges the comparison source-program 11-1 and the comparison edited-program 12-1 of the comparison target program 103X, in the vertical direction according to the order of execution. The difference display control unit 16 causes the display device 2 to display, as a comparison target program 202, the comparison source-program 11-1 and the comparison edited-program 12-1 that have each been rearranged in the vertical direction according to the order of execution. At this time, the difference display control unit 16 controls to highlight a set that is the difference between the comparison source-program 11-1 and the comparison edited-program 12-1 by color-coding or the like on the basis of the difference information from the difference detection unit 14.

Here, the difference between the comparison source-program 11-1 and the comparison edited-program 12-1 is the set "G1". When the set "G1" is pressed (selected) by a user operation and then a merge button 81 is pressed by a user operation, the program merge unit 18 merges the set "G1" in the comparison edited-program 12-1 into the comparison source-program 11-1. The program merge unit 18 thus inserts the set "G1" into the comparison source-program 11-1 such that the Y coordinate of the set "G1" in the comparison edited-program 12-1 and the Y coordinate of the set "G1" in the comparison source-program 11-1 are the same. Here, the program merge unit 18 inserts the set "G1" to a first position that is the position between the set "C" and the set "D" in comparison source-program 11-1.

The program merge unit 18 further causes the display device 2 to display a comparison target program 103Y that is the comparison target program after the change (after the merge). At this time, the program merge unit 18 causes the set "G1" to be displayed in the comparison source-program 11-1 such that the Y coordinate of the set "G1" in the comparison edited-program 12-1 and the Y coordinate of the set "G1" in the comparison source-program 11-1 are the same. Here, the program merge unit 18 causes the set "G1" to be displayed so as to have the Y coordinate between those of the set "C" and the set "D" in the comparison source-program 11-1. The program merge unit 18 may set the X coordinate of the set "G1" in the comparison source-program 11-1 to any position as long as the order of execution of the set "C", the set "G1", and the set "D" is not switched around. For example, the program merge unit 18 causes the set "G1" to be displayed such that the X coordinate of the set "G1" in the comparison edited-program 12-1 and the X coordinate of the set "G1" in the comparison source-program 11-1 are the same.

Note that when the set "G1" cannot be arranged due to insufficient space in the Y coordinate at the time of merging and displaying the set "G1", the program merge unit 18 corrects the Y coordinate between the sets on the basis of the Y coordinate of the set "G1", and then inserts and displays the set "G1" for merging. For example, when there is no space for the set "G1" to be inserted between the set "C" and the set "D" in the comparison source-program 11-1, the program merge unit 18 corrects the Y coordinate of the set "D" and the subsequent sets downward to provide a space between the set "C" and the set "D", thereby inserting the set "G1" into the space.

Figure 8:
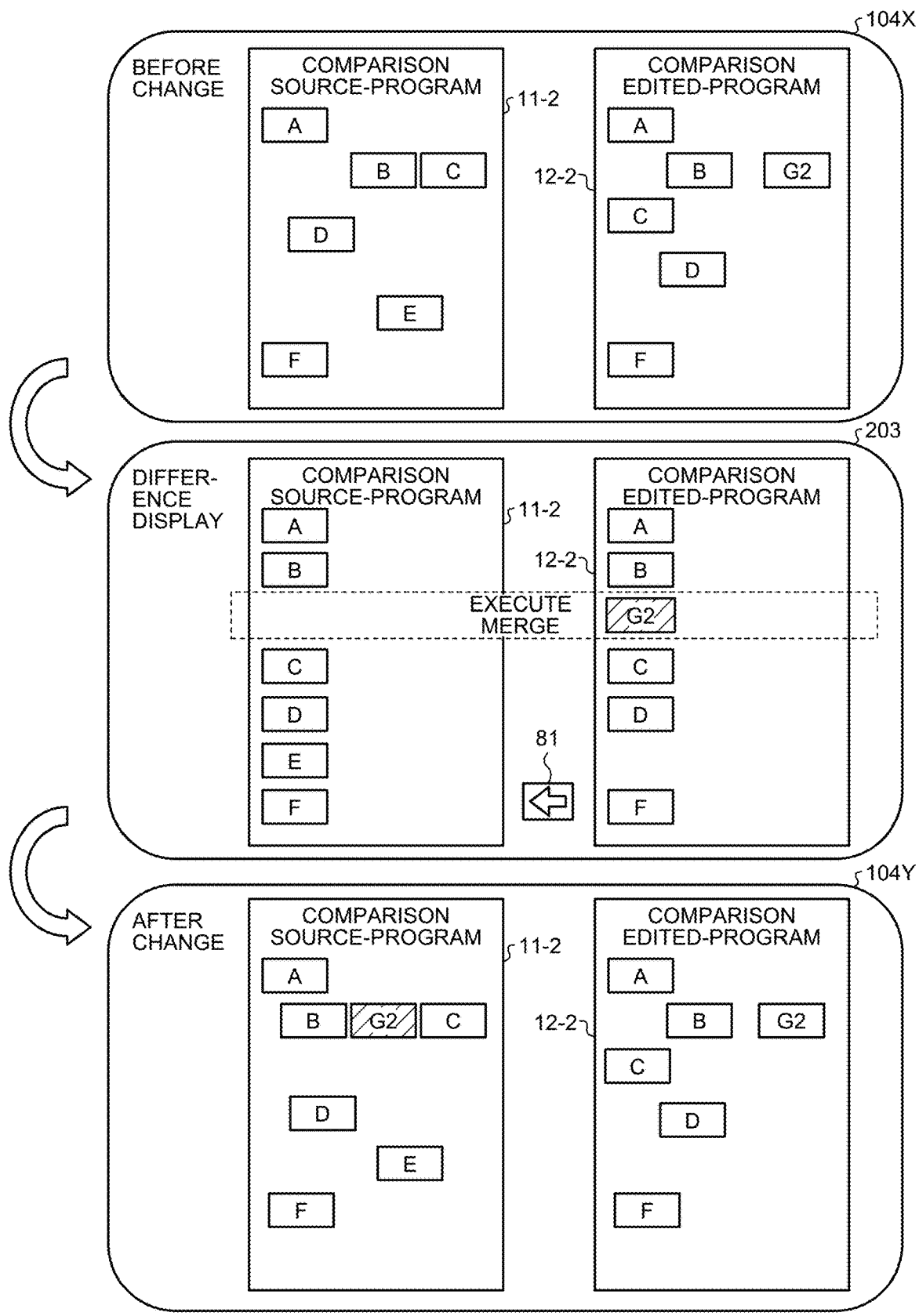
FIG. 8 is a diagram illustrating a second display example of a comparison target program that is merged by the program comparison apparatus according to the embodiment.

FIG. 8 is a diagram illustrating a second display example of a comparison target program that is merged by the program comparison apparatus according to the embodiment. In the second display example, when the program comparison apparatus 1 merges and displays the comparison target program, the X coordinate of a set in a comparison source-program 11-2 is corrected for display.

It is assumed that the comparison target program before the change (before the merge) is a comparison target program 104X illustrated in FIG. 8. The comparison target program 104X includes the comparison source-program 11-2 and a comparison edited-program 12-2. Here, the comparison edited-program 12-2 is obtained by adding the set "G2" to the comparison source-program 11-2. Note that the program comparison apparatus 1 may or need not display the comparison target program 104X on the display device 2.

The difference processing unit 13 rearranges the comparison source-program 11-2 and the comparison edited-program 12-2 of the comparison target program 104X in the vertical direction according to the order of execution. The difference display control unit 16 causes the display device 2 to display, as a comparison target program 203, the comparison source-program 11-2 and the comparison edited-program 12-2 that have each been rearranged in the vertical direction according to the order of execution. At this time, the difference display control unit 16 controls to highlight a set that is the difference between the comparison source-program 11-2 and the comparison edited-program 12-2 by color-coding or the like on the basis of the difference information from the difference detection unit 14.

Here, the difference between the comparison source-program 11-2 and the comparison edited-program 12-2 is the set "G2" that is a third set. When the set "G2" is pressed by a user operation and then the merge button 81 is pressed by a user operation, the program merge unit 18 merges the set "G2" in the comparison edited-program 12-2 into the comparison source-program 11-2. The program merge unit 18 thus inserts the set "G2" into the comparison source-program 11-2 such that the Y coordinate of the set "G2" in the comparison edited-program 12-2 and the Y coordinate of the set "G2" in the comparison source-program 11-2 are the same. Here, the program merge unit 18 inserts the set "G2" between the set "B" and the set "C" in the comparison source-program 11-2.

The program merge unit 18 further causes the display device 2 to display a comparison target program 104Y that is the comparison target program after the change (after the merge). At this time, the program merge unit 18 causes the set "G2" to be displayed in the comparison source-program 11-2 such that the Y coordinate of the set "G2" in the comparison edited-program 12-2 and the Y coordinate of the set "G2" in the comparison source-program 11-2 are the same. Here, the program merge unit 18 causes the set "G2" to be displayed so as to have the X coordinate between those of the set "B" and the set "C", that is, so as to have the same Y coordinate as those of the set "B" and the set "C", in the comparison source-program 11-2. Here, the set "G2" is the third set, and the set "B" and the set "C" are a fourth set.

When the set "G2" cannot be arranged due to insufficient space in the X coordinate at the time of merging and displaying the set "G2", the program merge unit 18 corrects the X coordinate between the sets to insert and display the set for merging. That is, when a set having the same Y coordinate as the Y coordinate of the set "G2" is included in the comparison source-program 11-2 at the time of merging and displaying the set "G2", there may be insufficient space in the X direction to arrange the set "G2" in the comparison source-program 11-2. When there is not enough space in the X coordinate as just described, the program merge unit 18 corrects the X coordinate between the sets in the comparison source-program 11-2 to insert and display the set "G2" for merging.

For example, when there is no space for the set "G2" to be inserted between the set "B" and the set "C" in the comparison source-program 11-2, the program merge unit 18 shifts the set "B" to the left to provide a space between the set "B" and the set "C", thereby inserting the set "G2" into the space. The program merge unit 18 may shift the set "C" to the right to provide a space between the set "B" and the set "C", and insert the set "G2" into the space. As described above, when merging the set "G2" into the comparison source-program 11-2, the program comparison apparatus 1 corrects the X and Y coordinates of the sets in the comparison source-program 11-2 such that the set "G2" is between the set "B" and the set "C" in the order of execution, and then inserts the set "G2" into the comparison source-program 11-2 for display.

This enables merging of the FBD program that can be written in free format, and eliminates the need for manual merging by performing automatic merging. As a result, mistakes in merging can be reduced, and also the time for the merging work can be reduced. Moreover, because merging is executed for each set, merging for the FBD program can be made even if lines cannot be distinguished by the connection to left and right bus lines as in a ladder program.

Figure 9:
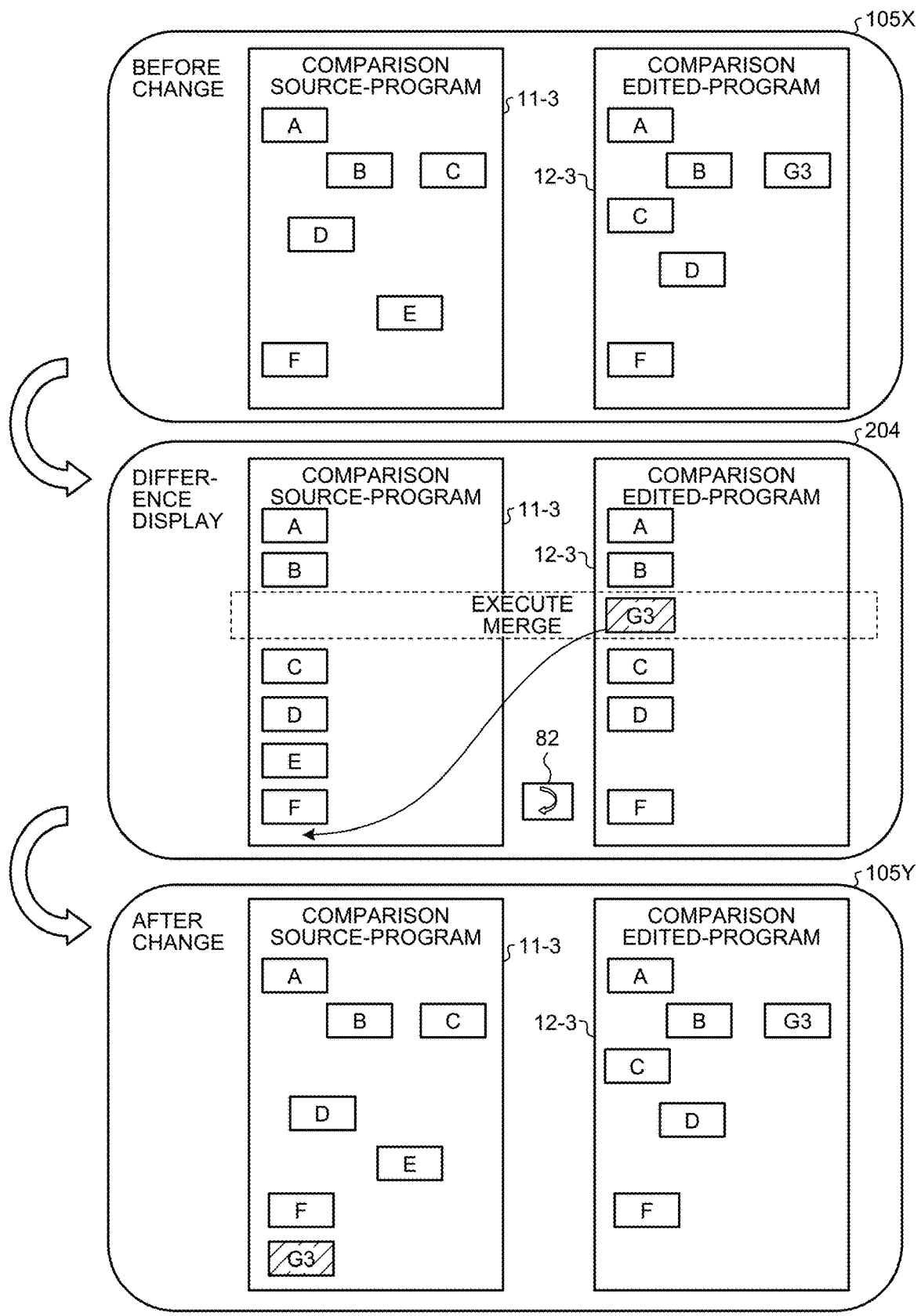
FIG. 9 is a diagram illustrating a third display example of a comparison target program that is merged by the program comparison apparatus according to the embodiment.

FIG. 9 is a diagram illustrating a third display example of a comparison target program that is merged by the program comparison apparatus according to the embodiment. In the third display example, when the program comparison apparatus 1 merges and displays the comparison target program, the X and Y coordinates of a set in a comparison source-program 11-3 are corrected for display.

It is assumed that the comparison target program before the change (before the merge) is a comparison target program 105X illustrated in FIG. 9. The comparison target program 105X includes the comparison source-program 11-3 and a comparison edited-program 12-3. Here, the comparison edited-program 12-3 is obtained by adding the set "G3" and deleting the set "E" with respect to the comparison source-program 11-3. Note that the program comparison apparatus 1 may or need not display the comparison target program 105X on the display device 2.

The difference processing unit 13 rearranges the comparison source-program 11-3 and the comparison edited-program 12-3 of the comparison target program 105X in the vertical direction according to the order of execution. The difference display control unit 16 causes the display device 2 to display, as a comparison target program 204, the comparison source-program 11-3 and the comparison edited-program 12-3 that have each been rearranged in the vertical direction according to the order of execution. At this time, the difference display control unit 16 controls to highlight a set that is the difference between the comparison source-program 11-3 and the comparison edited-program 12-3 by color-coding or the like on the basis of the difference information from the difference detection unit 14.

The difference between the comparison source-program 11-3 and the comparison edited-program 12-3 is the set "G3" and the set "E" being a fifth set. When the set "G3" is pressed by a user operation, a position selection button 82 is pressed by a user operation, and then a second position being a position in the comparison source-program 11-3 to which the set "G3" is to be inserted is pressed by a user operation, the program merge unit 18 merges the set "G3" in the comparison edited-program 12-3 into the comparison source-program 11-3. The program merge unit 18 thus inserts the set "G3" in the comparison edited-program 12-3 to the position having the X and Y coordinates indicated by the user operation. Here, the program merge unit 18 inserts the set "G3" under the set "F" in the comparison source-program 11-3.

The program merge unit 18 further causes the display device 2 to display a comparison target program 105Y that is the comparison target program after the change (after the merge). At this time, the program merge unit 18 causes the set "G3" to be displayed in the comparison source-program 11-3 such that the set "G3" is under the set "F" in the comparison source-program 11-3.

The user can thus arbitrarily select the merge position, so that the set in the comparison edited-program 12-3 can be inserted to the arbitrary position in the comparison source-program 11-3. Therefore, the time and effort for changing the order of execution can be reduced, and the work time can be reduced.

Note that the merging method is not limited to the methods described with reference to FIGS. 7 to 9. Moreover, the screens displaying the comparison target programs 202 to 204 may each be provided with a button for collectively merging all the edited sets into the comparison source-programs 11-1 to 11-3.

Figure 10:
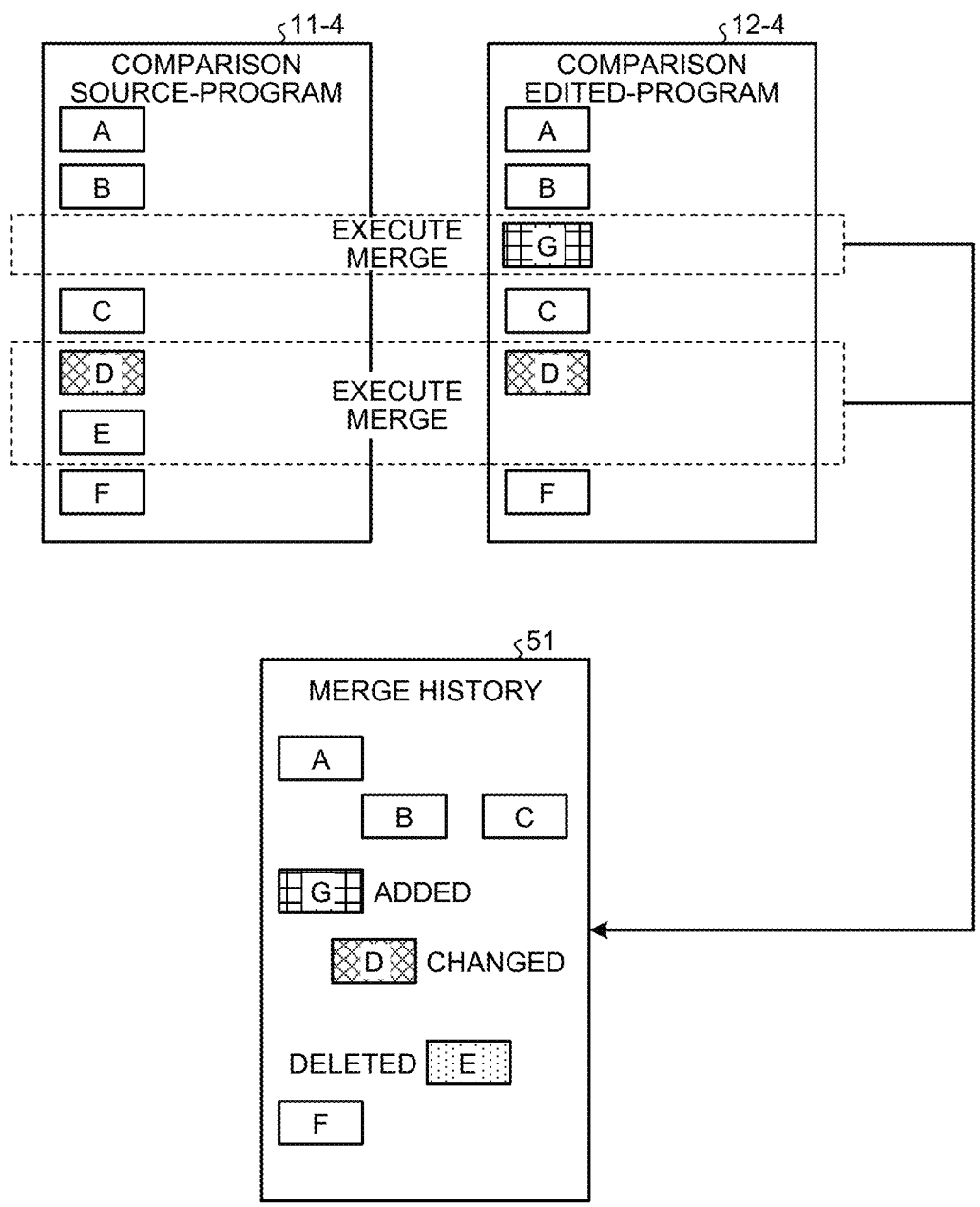
FIG. 10 is a diagram for explaining a method of creating a merge history that is created by the program comparison apparatus according to the embodiment.

Next, the merge history created by the program merge unit 18 will be described. FIG. 10 is a diagram for explaining a method of creating a merge history that is created by the program comparison apparatus according to the embodiment. FIG. 10 illustrates an image of an example of the merge history created when the FBD program is merged.

In executing a merge, the program merge unit 18 creates a merge history and causes the merge history storage unit 19 to store the merge history. The merge history includes information about which set is changed, deleted, or added when the merge is executed.

The program merge unit 18 extracts sets merged with respect to a comparison source-program 11-4 and a comparison edited-program 12-4. Here, a description will be given of a case where the comparison edited-program 12-4 is obtained by adding the set "G", changing the set "D", and deleting the set "E" with respect to the comparison source-program 11-4. In this case, when the program merge unit 18 merges the set "G", the set "D", and the set "E", the program merge unit 18 adds the set "G" to the comparison source-program 11-4, changes the set "D" therein, and deletes the set "E" therefrom. The program merge unit 18 further creates a merge history 51 including information indicating that the set "G" has been added, information indicating that the set "D" has been changed, and information indicating that the set "E" has been deleted.

The merge history 51 is assumed to include details of the change in the set "D". The details of the change in the set "D" include the details of the set "D" after the change. Note that the details of the change in the set "D" may or need not include the details of the set "D" before the change.

The merge history 51 also includes information on display colors in displaying the merged sets. For example, the merge history 51 stores information that the changed set "D" is displayed in red, the deleted set "E" is displayed in blue, and the added set "G" is displayed in green. Note that the method of displaying the merged sets is not limited to this.

Although an increase in the number of merges may cause an operational error in merging, the program comparison apparatus 1 creates and stores the merge history, thereby a user can easily check the changes made before and after the merge on the basis of the merge history. As a result, the user can reduce the time and effort for checking the changes in the sets from before the merge. The user can also easily check whether or not there has been an operational error in merging. Therefore, the time for the comparing work can be reduced.

Figure 11:
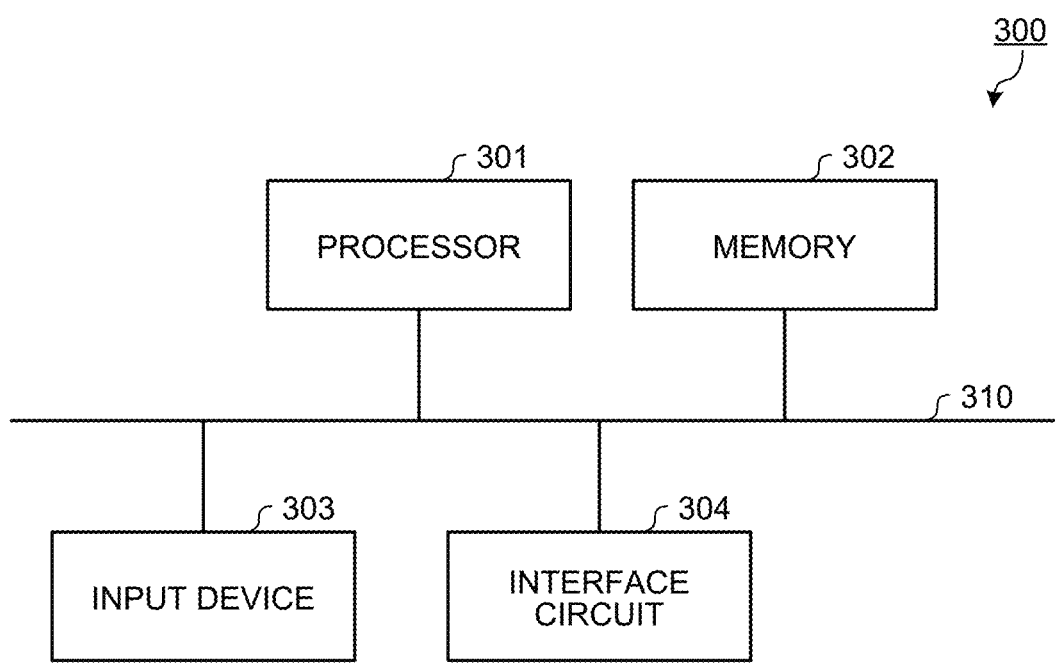
FIG. 11 is a diagram illustrating a hardware configuration that implements the program comparison apparatus according to the embodiment.

Here, a hardware configuration of the program comparison apparatus 1 will be described. FIG. 11 is a diagram illustrating the hardware configuration that implements the program comparison apparatus according to the embodiment. The program comparison apparatus 1 is implemented by a processor 301, a memory 302, an input device 303, and an interface circuit 304. The processor 301 controls the memory 302, the input device 303, and the interface circuit 304. Examples of the input device 303 include a mouse, a keyboard, and a touch panel. The input device 303 receives an instruction from a user and inputs the instruction to the processor 301. The interface circuit 304 outputs a result of data processing by the processor 301 to the display device 2.

The processor 301 is, for example, a central processing unit (CPU) or a system large scale integration (LSI), the CPU being also referred to as a central processor, a processing unit, an arithmetic unit, a microprocessor, a microcomputer, a processor, or a DSP. The memory 302 is, for example, a random access memory (RAM) or a read only memory (ROM).

The program comparison apparatus 1 is implemented by the processor 301 reading and executing a program that is stored in the memory 302 for executing the operation of the program comparison apparatus 1. It can also be said that the program causes a computer to execute the procedure or method related to the program comparison apparatus 1. The memory 302 is also used as a temporary memory when the processor 301 executes various processings.

The program executed by the processor 301 may be a computer program product including a computer-readable non-transitory recording medium that can be run on a computer and includes a plurality of commands for data processing. The program executed by the processor 301 causes a computer to execute data processing by the plurality of commands.

Moreover, the program comparison apparatus 1 may be implemented by dedicated hardware. The functions of the program comparison apparatus 1 may also be implemented partly by dedicated hardware and partly by software or firmware.

As described above, according to the embodiment, the program comparison apparatus 1 arranges the sets of the comparison source-program 11 in the vertical direction in the left area 51A and arranges the sets of the comparison edited-program 12 in the vertical direction in the right area 51B to compare the programs against each other, so that many sets can be displayed on the screen. A user can thus easily refer to the comparison result of the FBD program written in the FBD language. Therefore, the user can compare the FBD programs in a short time.

Moreover, the program comparison apparatus 1 extracts and displays the difference in the property information of a set indicated by a user on the basis of the difference information, thereby the user can check the difference in the property information in a short time.

Also, since the program comparison apparatus 1 automatically merges the set indicated by the user, the user does not need to perform the merge manually. As a result, the user can reduce the time for the merging work. The user can also reduce the time required for creating the merge history because the program comparison apparatus 1 automatically creates the merge history.

The configuration illustrated in the above embodiment merely illustrates an example of the content of the present invention, and can thus be combined with another known technique or partially omitted and/or modified without departing from the scope of the present invention.

REFERENCE SIGNS LIST 1 program comparison apparatus; 2 display device; 10 data storage unit; 11, 11-1 to 11-4 comparison source-program; 12, 12-1 to 12-4 comparison edited-program; 13 difference processing unit; 14 difference detection unit; 15 set alignment unit; 16 difference display control unit; 17 property information display control unit; 18 program merge unit; 19 merge history storage unit; 20 instruction input unit; 21 program input unit; 42 to 45 FBD component; 61A, 61B, 62A, 63A, 63B, 64B set; 101, 102, 201 screen; 103X, 103Y, 104X, 104Y, 105X, 105Y, 202 to 204 comparison target program.

The invention claimed is:

1. A program comparison apparatus comprising:
a processor; and
a memory which, when executed by the processor, performs processes of:
dividing a first program which is a first function block diagram program into sets of program components connected to one another in the first program, and rearranging the sets of the first program in a line along a Y-axis direction which is a vertical direction in ascending order of execution, and also dividing a second program which is a second function block diagram program into sets of program components connected to one another in the second program, and rearranging the sets of the second program in a line along the Y-axis direction in ascending order of execution, the first program including a plurality of the sets of first program components arranged in an X-axis direction which is a horizontal direction, and the second program including a plurality of the sets of second program components arranged in the X-axis direction which is the horizontal direction;
detecting a difference in the sets between the first program and the second program as difference information by comparing the sets of the first program rearranged and the sets of the second program rearranged; and
causing the sets of the first program and the sets of the second program that are rearranged, to be displayed within a screen of a display device that displays the first program and the second program, and causing the first program and the second program to be displayed side by side such that each of the sets of the first program and each of the sets of the second program corresponding to each other are displayed at the same level in the Y-axis direction, on the basis of the difference information.

2. The program comparison apparatus according to claim 1, wherein
the processor displays some of the sets included in the difference information such that the some of the sets can be distinguished from the rest of the sets.

3. The program comparison apparatus according to claim 1, wherein
the processor rearranges the sets included in the first program in the Y-axis direction in ascending order of a Y coordinate, and rearranges, when some of the sets have the same Y coordinate, the some of the sets in the Y-axis direction in ascending order of an X coordinate,
the processor rearranges the sets included in the second program in the Y-axis direction in ascending order of a Y coordinate, and rearranges, when some of the sets have the same Y coordinate, the some of the sets in the Y-axis direction in ascending order of an X coordinate,
the processor detects the difference information on the basis of arrangement of the sets rearranged, and
the processor causes the first program and the second program to be displayed on the basis of the arrangement of the sets rearranged.

4. The program comparison apparatus according to claim 3, wherein
the processor aligns left ends of the sets rearranged and included in the first program, and aligns left ends of the sets rearranged and included in the second program.

5. The program comparison apparatus according to claim 3, wherein
the processor arranges the sets rearranged and included in the first program at regular intervals in the Y-axis direction, and arranges the sets rearranged and included in the second program at regular intervals in the Y-axis direction.

6. The program comparison apparatus according to claim 1, wherein
the first program includes first property information of a first set included in the first program,
the second program includes second property information of a second set included in the second program,
the difference information includes a property difference that is a difference between the first property information and the second property information, and
the processor further causes the first property information and the second property information to be displayed on the screen, when an instruction for displaying the first property information and the second property information is received from a user in a case where the first set and the second set are displayed at the same level in the Y-axis direction on the screen, the first property information and the second property information which is displayed on the basis of the property difference such that a part corresponding to the difference between the first property information and the second property information is capable of being distinguished from another part.

7. The program comparison apparatus according to claim 1, further comprising wherein
the processor further merges a third set in the second program into the first program at a first position that is at the same level in the Y-axis direction as the third set, when an instruction to merge the third set into the first program is received from a user for the first program and the second program displayed side by side in the screen, wherein
when the third set cannot be arranged at the first position, the processor corrects a Y coordinate of the set in the first program on the basis of a Y coordinate of the third set.

8. The program comparison apparatus according to claim 7, wherein
when the first program includes a fourth set having the same Y coordinate as the third set and the third set cannot be arranged at the first position, the processor corrects an X coordinate of the fourth set.

9. The program comparison apparatus according to claim 7, wherein
when a user indicates a fifth set in the second program and a second position in the first program, the processor merges the fifth set to the second position.

10. The program comparison apparatus according to claim 7, wherein
the processor creates a merge history on the basis of a merged part and causes the screen to display the merge history.

11. The program comparison apparatus according to claim 1, wherein
the first program is an existing and proven comparison source-program, and
the second program is a comparison edited-program that is obtained by editing the comparison source-program.

12. A program comparison method comprising:
dividing a first program which is a first function block diagram program into sets of program components connected to one another in the first program, and rearranging the sets of the first program in a line along a Y-axis direction which is a vertical direction in ascending order of execution, and also dividing a second program which is a second function block diagram program into sets of program components connected to one another in the second program, and rearranging the sets of the second program in a line along the Y-axis direction in ascending order of execution, the first program including a plurality of the sets of first program components arranged in an X-axis direction which is a horizontal direction, and the second program including a plurality of the sets of second program components arranged in the X-axis direction which is the horizontal direction;
detecting a difference in the sets between the first program and the second program as difference information by comparing the sets of the first program rearranged and the sets of the second program rearranged; and
causing the sets of the first program and the sets of the second program that are rearranged, to be displayed within a screen of a display device that displays the first program and the second program, and causing the first program and the second program to be displayed side by side such that each of the sets of the first program and each of the sets of the second program corresponding to each other are displayed at the same level in the Y-axis direction, on the basis of the difference information.

13. A non-transitory computer readable medium that stores a program comparison program that causes a computer to execute:
dividing a first program which is a first function block diagram program into sets of program components connected to one another in the first program, and rearranging the sets of the first program in a line along a Y-axis direction which is a vertical direction in ascending order of execution, and also dividing a second program which is a second function block diagram program into sets of program components connected to one another in the second program, and rearranging the sets of the second program in a line along the Y-axis direction in ascending order of execution, the first program including a plurality of the sets of first program components arranged in an X-axis direction which is a horizontal direction, and the second program including a plurality of the sets of second program components arranged in the X-axis direction which is the horizontal direction;
detecting a difference in the sets between the first program and the second program as difference information by comparing the sets of the first program rearranged and the sets of the second program rearranged; and
causing the sets of the first program and the sets of the second program that are rearranged, to be displayed within a screen of a display device that displays the first program and the second program, and causing the first program and the second program to be displayed side by side such that each of the sets of the first program and each of the sets of the second program corresponding to each other are displayed at the same level in the Y-axis direction, on the basis of the difference information.

\* \* \* \* \*